United States Patent
Helsel et al.

(10) Patent No.: US 10,592,657 B2
(45) Date of Patent: *Mar. 17, 2020

(54) AUTOMATED SECURE DISPOSAL OF HARDWARE COMPONENTS

(71) Applicant: Microsoft Technology Licensing, LLC, Redmond, WA (US)

(72) Inventors: Michael Helsel, Seattle, WA (US); Ned Lecky, Seattle, WA (US); Nicholas Keehn, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,405

(22) Filed: May 9, 2019

(65) Prior Publication Data

US 2019/0266321 A1 Aug. 29, 2019

Related U.S. Application Data

(63) Continuation of application No. 15/442,332, filed on Feb. 24, 2017, now Pat. No. 10,331,876.

(51) Int. Cl.
| | |
|---|---|
| G06F 21/00 | (2013.01) |
| G06F 21/44 | (2013.01) |
| B25J 9/00 | (2006.01) |
| G06F 21/88 | (2013.01) |
| G06F 21/86 | (2013.01) |
| B25J 11/00 | (2006.01) |
| G06F 21/30 | (2013.01) |

(52) U.S. Cl.
CPC ............... *G06F 21/44* (2013.01); *B25J 9/00* (2013.01); *B25J 11/008* (2013.01); *G06F 21/30* (2013.01); *G06F 21/86* (2013.01); *G06F 21/88* (2013.01)

(58) Field of Classification Search
CPC .......... G06F 21/30; G06F 21/31; G06F 21/44; G06F 21/45; G06F 21/70; G06F 21/82; G06F 21/86; G06F 21/88; A61H 2201/1659; B25J 9/00; B25J 11/008; B25J 13/00
See application file for complete search history.

(56) References Cited

U.S. PATENT DOCUMENTS

| | | | |
|---|---|---|---|
| 8,428,777 B1 * | 4/2013 | Poursohi | G05B 19/41865 700/247 |
| 2016/0107312 A1 * | 4/2016 | Morrill | B25J 9/1664 |
| 2018/0264559 A1 * | 9/2018 | Clark | B23C 3/00 |

* cited by examiner

Primary Examiner — Edward Zee
(74) Attorney, Agent, or Firm — Liang IP, PLLC

(57) ABSTRACT

Techniques of implementing automated secure disposal of hardware components in computing systems are disclosed herein. In one embodiment, a method includes receiving data representing a command instructing removal of a hardware component from a server in a datacenter upon verification. In response to receiving the maintenance command, the method includes autonomously navigating from a current location to the destination location corresponding to the server, verifying an identity of the hardware component at the destination location, and removing the hardware component from the server. The method further includes upon successful removal of the hardware component, generating and transmitting telemetry data indicating verification of the hardware component at the destination location and successful removal of the verified hardware component from the server.

19 Claims, 11 Drawing Sheets

AUTOMATED SECURE DISPOSAL OF HARDWARE COMPONENTS

CROSS-REFERENCE TO RELATED APPLICATION(S)

This application is a continuation of and claims priority to U.S. patent application Ser. No. 15/442,332, filed on Feb. 24, 2017, the disclosure of which is incorporated herein in its entirety.

BACKGROUND

Datacenters and other computing systems typically include routers, switches, bridges, and other physical network devices that interconnect a large number of servers, network storage devices, and other types of computing devices in racks, containers, or other enclosures. The individual servers can include processors, memory devices, hard disk drives, and other hardware components configured to execute computer instructions to provide one or more virtual machines or other types of virtualized components. The virtual machines can then be used to execute applications when performing desired tasks to provide cloud services or other suitable computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Distributed computing systems can include thousands, tens of thousands, or even millions of servers housed in racks, containers, or other enclosures. Each server can include, for example, a motherboard containing one or more processors or "cores," volatile memory (e.g., dynamic random access memory), persistent storage devices (e.g., hard disk drives, solid state drives, etc.), network interface cards, or other suitable hardware components. Such hardware components typically have useful lives beyond which reliability may not be expected or guaranteed. Also, such hardware components can fail during operation due to power surges, excessive temperatures/humidity, or other reasons. As such, the servers and/or hardware components thereof may need to be replaced occasionally, periodically, or upon detection of failure.

One consideration of replacing expiring or failed hardware components is ensuring data security. Certain servers can have persistent storage devices containing data with various levels of business importance. One technique of ensuring data security involves physically destroying a used persistent storage device. For example, upon detecting that a persistent storage device has failed, a technician can manually remove the failed persistent storage device and install a new one as a replacement. The technician can then physically destroy the removed persistent storage device by using a shredder or other suitable techniques.

The foregoing technique can be time consuming, costly, and susceptible to human error. For instance, the technician may erroneously replace a functioning persistent storage device instead of the failed one. In addition, record keeping according to the foregoing technique can involve a large amount of efforts and can be error prone. For example, to ensure proper record keeping, the technician may record each of the operations involved from removing to physically destroying the persistent storage device. Such detailed record keeping can be difficult due to the manual nature of this technique.

Several embodiments of the disclosed technology can improve efficiency and reduce costs of ensuring data security by implementing automated secure disposal of hardware components in a distributed computing system. In one implementation, a platform controller of a distributed computing system can receive operating status and/or issue notifications informing the platform controller that certain hardware component (e.g., a hard disk drive) attached to a server may require maintenance. In response, the platform controller can issue a maintenance request to a task scheduler configured to schedule and manage maintenance operations in the distributed computing system. Upon receiving the maintenance request, the task scheduler can be configured to determine suitable maintenance operations, select an autonomous mobile unit ("AMU") for performing the maintenance operations, and issue maintenance commands to the selected AMU to perform the maintenance operations.

The AMU can be implemented on a mobile platform with suitable computing facilities. In one example, an AMU can be implemented on a self-driving robot with an industrial personal computer ("IPC"), robotic arms, barcode scanners, or other suitable mechanical components installed on the self-driving robot. In other examples, the AMU can also include hard drive readers, voltmeters, or other suitable testing equipment. The self-driving robot can be configured to receive a destination location, determine a suitable route to the destination location, and autonomously navigate to the destination via the route without human intervention. Many techniques may be suitable for performing such autonomous navigation. For instance, simultaneous localization and mapping ("SLAM") may be implemented on the AMU in order to navigate from a current location to the destination location. In other examples, the AMU can be implemented using robot-on-rail or other suitable techniques.

The IPC can be configured to receive maintenance commands from the task scheduler via, for instance, a secured WIFI network or other suitable wireless network, and perform the requested maintenance operations accordingly. For example, the IPC can be configured to instruct the self-driving robot to navigate from the current location to the destination location. Upon arriving at the destination location, the IPC can be configured to cause the robotic arms, scanners, or other suitable mechanical/electrical components to verify the hard disk drive to be removed by scanning a bar code, a radio frequency ("RF") tag, or other suitable identification attached on or otherwise associated with the hard disk drive. Upon successful verification, the IPC can then be configured to cause the robotic arms to remove the hard disk drive, insert a new hard disk drive, record an identification of the new hard disk drive installed on the server, and transmit telemetry data regarding all of the performed maintenance operations to the task scheduler.

In certain embodiments, the AMU can include a secure bin into which the removed hard disk drive can be deposited for physical destruction at a central shredding facility or other suitable types of destruction facility. The AMU can record a time at which the removed hard disk drive is deposited into the secure bin and another time at which the secure bin is removed from the AMU. In other embodiments, the AMU can contain a shredder, a disk puncher, or other suitable types of component for physically destroying the removed hard disk drive. Once destroyed, the IPC on the AMU can generate additional information indicating that the remove hard disk drive with the corresponding identification has been securely destroyed.

Upon receiving the telemetry data from the AMU regarding the performed maintenance operations by the AMU, the task scheduler can be configured to organize and store records of maintenance data regarding each piece of hardware component currently residing in the distributed computing system. For example, the task scheduler can be configured to generate and maintain records of when a hard drive disk is received at the distributed computing system, installed into a server, removed from the server, and securely destroyed. As such, the task scheduler can efficiently maintain a clear "chain of custody" each piece of hardware component currently residing in the distributed computing system. Optionally, the task scheduler can also be configured to provide a maintenance report to the platform controller in response to the maintenance request. The platform controller can then verify that the reported issue has been resolved.

Several embodiments of the disclosed technology can be used to efficiently facilitate and track removal and destruction of hardware components in distributed computing systems. For example, utilizing AMUs instead of technicians can reduce if not eliminate manual operations involved in verifying, removing, installing, and destroying failed hardware components. The AMUs can also prevent removal of hardware components from the distributed computing system unless such removal is authorized. Also, by using AMUs, human access to the facility housing the distributed computing system can be reduced to improve security of the distributed computing system. In addition, by allowing direct communications or telemetry between the task scheduler and the AMUs, record keeping regarding any performed maintenance operations is straightforward and inexpensive.

DETAILED DESCRIPTION

Figure 1:
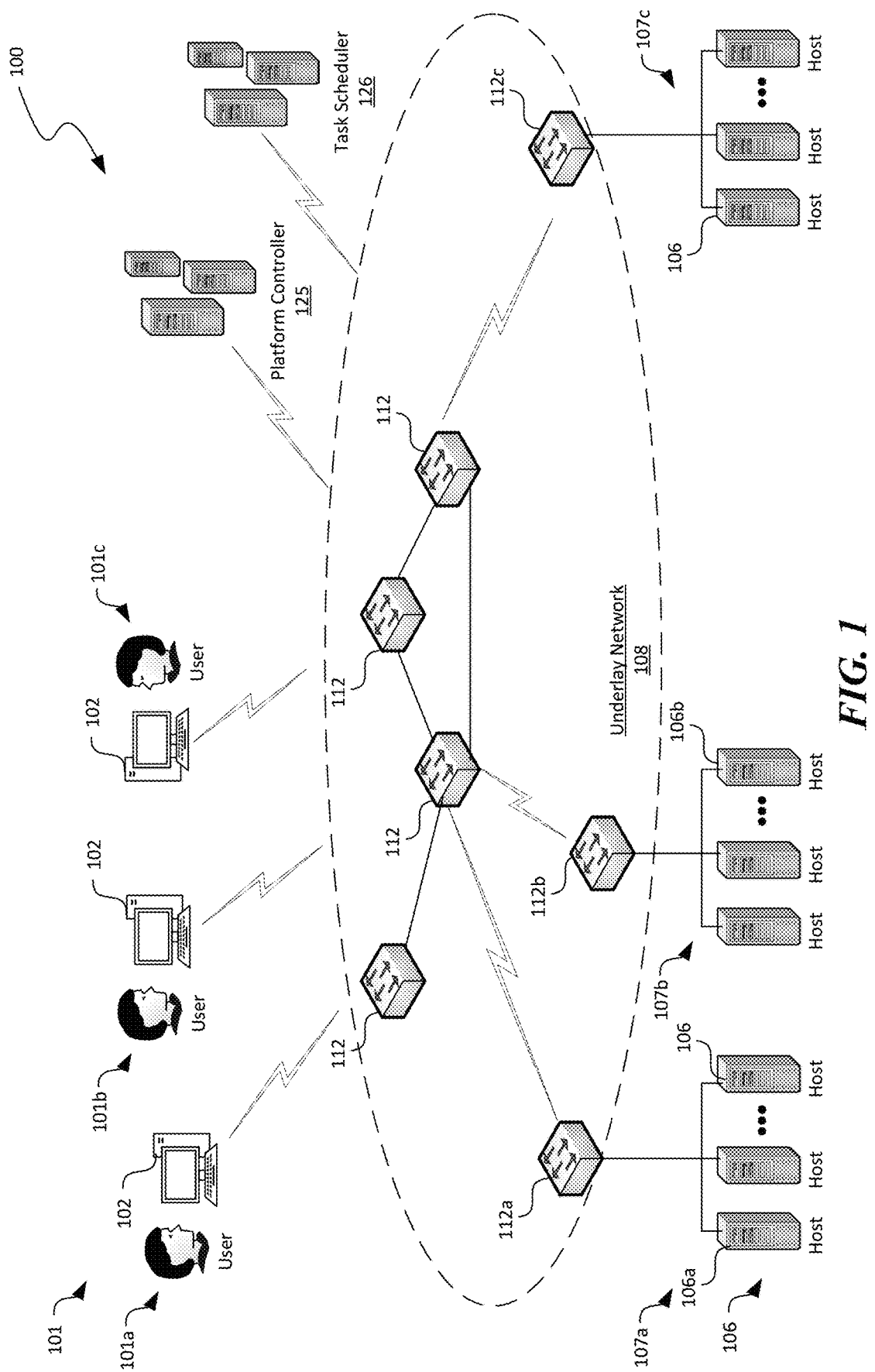
FIG. 1 is a schematic diagram illustrating a distributed computing system implemented with automated secure disposal of hardware components in accordance with embodiments of the disclosed technology.

Certain embodiments of systems, devices, components, modules, routines, data structures, and processes for implementing automated secure disposal of hardware components in distributed computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-10.

As used herein, the term "distributed computing system" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtual machines or other suitable virtualized components. For example, a host can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

Also used herein, the term "hardware component" of a computing device refers to a mechanical and/or electrical component configured to facilitate operations of the computing device. For instance, one type of example hardware components can include read-only memory ("ROM"), flash memory (e.g., NAND or NOR solid state drives or SSDs), phase change memory, spin-transfer torque magnetic random-access memory, magnetic storage devices (e.g. hard disk drives or HDDs), or other suitable types of persistent storage device. Another type of example hardware components can include network interface cards, backup power units, and/or other suitable components of the computing device. A further type of example hardware components can also include server assemblies having a motherboard carrying a processor, a memory (e.g., DRAM), a memory controller, a power source, a network interface card, a baseboard management controller, a fan, and/or other suitable mechanical and/or electrical components.

Also used herein, the term "maintenance operation" generally refers to an operation involved in troubleshooting, repairing, upgrading, replacing, installing a hardware component in a distributed computing system. An example maintenance operation can include verifying an identity of a hardware component at a location corresponding to a server. Another example maintenance operation can include replacing the verified hardware component, installing a new hardware component, verifying proper installation of the new hardware component, and/or other suitable operations Further used herein, the term "autonomous mobile unit" or "AMU" generally refers to a robot or machine configured to perform tasks with a high degree of autonomy. An AMU can be configured to obtain information about an environment that the AMU is in by utilizing stereo video camera, light detection/ranging ("LIDAR"), global positioning system ("GPS"), or other suitable sensors. An AMU can also be configured to work for an extended period without human intervention and move around in an operating environment (e.g., a datacenter or parts thereof) without human assistance. For instance, simultaneous localization and mapping ("SLAM") may be implemented on the AMU in order to navigate from a starting location to a destination in a datacenter.

In one example, an AMU can be implemented by installing an industrial personal computer ("IPC") on a self-driving robot. One suitable self-driving robot is the Husky unmanned ground vehicle ("UGV") provided by Clearpath Robotics of Kitchener, Canada. The IPC can be configured to implement embodiments of the automated secure disposal of hardware components, as described herein. An example AMU implemented on a self-driving robot is described below in more detail with reference to FIGS. 4A and 4B. In other examples, an AMU can be implemented using robot-on-rail or other suitable techniques. In further examples, an AMU can also be a built-in unit having moving/non-moving arms, sensors, moving floors, stackers, bucket elevators, hoppers, and/or other suitable components. In such examples, servers or other computing devices can be provided to the AMU for processing via, for instance, one or more conveyor belts, robots, or other suitable sources.

In addition, as used herein, the term "telemetry data" generally refers to data representing reports, feedbacks, or other suitable communications transmitted from an AMU to a central data collector, such as a task scheduler described below. Example telemetry data can include data indicating verification of a hardware component at a destination location, removal of the verified hardware component from a server, and installation of a new hardware component into the server. Other example telemetry data can also include a location in a datacenter at which the hardware component is removed, a date and time at which the hardware component is removed, an ambient temperature and/or humidity under which the hardware component is removed, a video recording of removing the hardware component, or other suitable information.

Ensuring data security when performing maintenance operations in a datacenter with technicians can be time consuming, costly, and prone to error. For instance, a technician may erroneously replace a functioning hard disk drive instead of a failed one. In addition, manual record keeping can involve a large amount of efforts and be error prone. For example, to ensure proper record keeping, the technician must record each of the maintenance operations performed from verifying, removing, to physically destroying the hard disk drive. Precise record keeping can thus be difficult if not impossible.

Several embodiments of the disclosed technology can improve efficiency and reduce costs of ensuring data security in datacenters and other distributed computing systems by implementing automated secure disposal of hardware components using AMUs instead of technicians. In one implementation, in response to a maintenance request, a task scheduler can be configured to determine suitable maintenance operations, select an AMU from a collection of AMUs for performing the maintenance operations, and issue maintenance commands to the selected AMU. Upon receiving the maintenance commands, the AMU can autonomously perform the requested maintenance operations accordingly. For example, the AMU can autonomously navigate from a current location to a destination location. Upon reaching the destination, the AMU can use a robotic arm, scanner, or other suitable mechanical components to verify the hard disk drive to be removed by scanning a bar code, a radio frequency ("RF") tag, or other suitable identification on the hard disk drive. The AMU can then remove the hard disk drive, insert a new hard disk drive, record an identification of the new hard disk drive installed on the server, and transmit information regarding all of the performed maintenance operations to the task scheduler.

As such, several embodiments of the disclosed technology can be efficient in tracking removal and destruction of certain hardware components in the distributed computing system. For example, utilizing AMUs instead of technicians can reduce if not eliminate manual operations involved in verifying, removing, and destroying failed hardware components. The AMUs can also prevent removal of hardware components from the distributed computing system unless such removal is authorized. Also, by using AMUs, human access to the facility housing the distributed computing system can be reduced to improve security of the distributed computing system. In addition, by allowing direct communications or telemetry between the task scheduler and the AMUs, record keeping regarding any performed maintenance operations is straightforward and inexpensive, as described in more detail below with reference to FIGS. 1-10.

FIG. 1 is a schematic diagram illustrating a distributed computing system 100 implementing automated secure disposal of hardware components in accordance with embodiments of the disclosed technology. As shown in FIG. 1, the distributed computing system 100 can include an underlay network 108 interconnecting a plurality of hosts 106, a plurality of client devices 102 associated with corresponding users 101, a platform controller 125, and a task scheduler 126 operatively coupled to one another. Even though particular components of the distributed computing system 100 are shown in FIG. 1, in other embodiments, the distributed computing system 100 can also include additional and/or different components or arrangements. For example, in certain embodiments, the task scheduler 126 can be an integral part of the platform controller 125. In other embodiments, the task scheduler 126 can be a standalone server or a computing service hosted on one or more of the hosts 106. In further embodiments, the distributed computing system 100 can also include network storage devices, additional hosts, and/or other suitable components (not shown).

As shown in FIG. 1, the underlay network 108 can include one or more network nodes 112 that interconnect the multiple hosts 106, the users 101, and the platform controller 125. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology. The computer network can allow communication between hosts 106, the platform controller 125, and the users 101. In other embodiments, the multiple host sets 107a-107c may share a single network node 112 or can have other suitable arrangements.

The hosts 106 can individually be configured to provide computing, storage, and/or other suitable cloud or other suitable types of computing services to the users 101. For example, as described in more detail below with reference to FIG. 2, one of the hosts 106 can initiate and maintain one or more virtual machines 144 (shown in FIG. 2) upon requests from the users 101. The users 101 can then utilize the initiated virtual machines 144 to perform computation, communication, and/or other suitable tasks. In certain embodiments, one of the hosts 106 can provide virtual machines 144 for multiple users 101. For example, the host 106a can host three virtual machines 144 individually corresponding to each of the users 101a-101c. In other embodiments, multiple hosts 106 can host virtual machines 144 for the users 101a-101c.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

The platform controller 125 can be configured to manage operations of various hardware/software components of the distributed computing system 100. For example, the platform controller 125 can be configured to allocate virtual machines 144 (or other suitable resources) in the distributed computing system 100 in response to requests from the users 101, monitor operations of the allocated virtual machines 144, or terminate any allocated virtual machines 144 once operations are complete. In other examples, the platform controller 125 can also be configured to receive notifications of issues from the hosts 106, the network nodes 112, or other suitable components of the distributed computing system 100. The platform controller 125 can then transmit a maintenance request to the task scheduler 126 for scheduling one or more maintenance operations, as described in more detail below with reference to FIGS. 3A-3C.

In the illustrated implementation, the platform controller 125 is shown as one or more independent severs in the distributed computing system 100. In other embodiments, the platform controller 125 can also be a component of a datacenter controller, a fabric controller, or other suitable types of controller implemented on one or more standalone servers or as a computing service on one or more of the hosts 106. Examples of the platform controller 125 can include Amazon Web Services ("AWS") controller, Microsoft Azure controller, and Google Cloud Platform controller.

The task scheduler 126 can be configured to determine a set of suitable maintenance operations upon receiving the maintenance request from the platform controller. The task scheduler 126 can also be configured to select an autonomous mobile unit ("AMU") from, for example, a collection of AMUs for performing the determined maintenance operations. Once selected, the task scheduler 126 can be configured to issue suitable maintenance commands to the selected AMU via, for instance, a WIFI network link with the AMU. In turn, the AMU can autonomously perform the set of maintenance operations and transmit telemetry data regarding all of the performed maintenance operations to the task scheduler 126. Upon receiving the telemetry data regarding all of the performed maintenance operations from the AMU, the task scheduler 126 can be configured to organize and store records of maintenance data regarding each piece of hardware component currently residing in the distributed computing system 100, as described in more detail below with reference to FIGS. 3A-3C.

Figure 2:
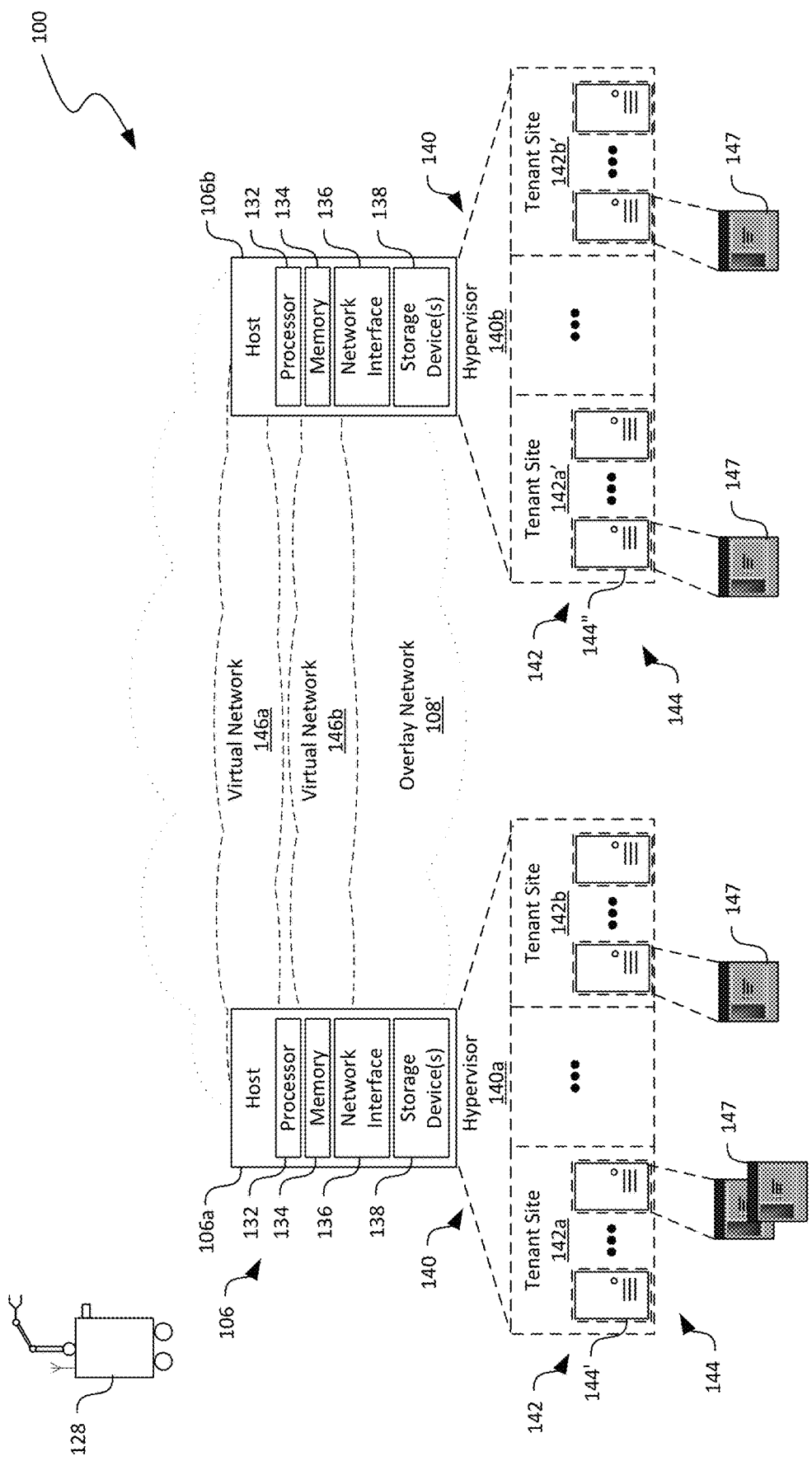
FIG. 2 is a schematic diagram illustrating certain hardware/software components of the distributed computing system in FIG. 1 in accordance with embodiments of the disclosed technology.

FIG. 2 is a schematic diagram illustrating certain hardware/software components of the distributed computing system 100 in accordance with embodiments of the disclosed technology. In particular, FIG. 2 illustrates an overlay network 108' that can be implemented on the underlay network 108 in FIG. 1. Though particular configuration of the overlay network 108' is shown in FIG. 2, In other embodiments, the overlay network 108' can also be configured in other suitable ways. In FIG. 2, only certain components of the underlay network 108 of FIG. 1 are shown for clarity. Also, in FIG. 2 and other figures herein, similar reference numbers designate similar components in structure and function.

In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software.

Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 7-9). The input/output component 136 can include a display, a touch screen, a keyboard, a mouse, a printer, and/or other suitable types of input/output devices configured to accept input from and provide output to an operator and/or an automated software controller (not shown).

The first and second hosts 106a and 106b can individually contain instructions in the memory 134 executable by the processors 132 to cause the individual processors 132 to provide a hypervisor 140 (identified individually as first and second hypervisors 140a and 140b). The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular user 101 (FIG. 1). For example, the first host 106a and the second host 106b can both host the tenant site 142a and 142a' for a first user 101a (FIG. 1). The first host 106a and the second host 106b can both host the tenant site 142b and 142b' for a second user 101b (FIG. 1). Each virtual machine 144 can be executing a corresponding operating system, middleware, and/or applications.

Also shown in FIG. 2, the distributed computing system 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 can be configured to execute one or more applications 147 to provide suitable cloud or other suitable types of computing services to the users 101 (FIG. 1). The virtual machines 144 on the virtual networks 146 can also communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

As shown in FIG. 2, the distributed computing system 100 can also deploy one or more AMUs 128 for performing automated secure disposal of hardware components in the distributed computing system 100. For example, the AMU 128 can be configured to verify, remove, replace, install, or perform other suitable operations to the first and second hosts 106a and 106b, as described in more detail below with reference to FIGS. 3A-4B. Only one AMU 128 is shown in FIG. 2 for illustration purposes. In other embodiments, the distributed computing system 100 can deploy any suitable numbers of AMUs 128 in each datacenter, activity zone, enclosure, or other suitable locations.

Figure 3A:
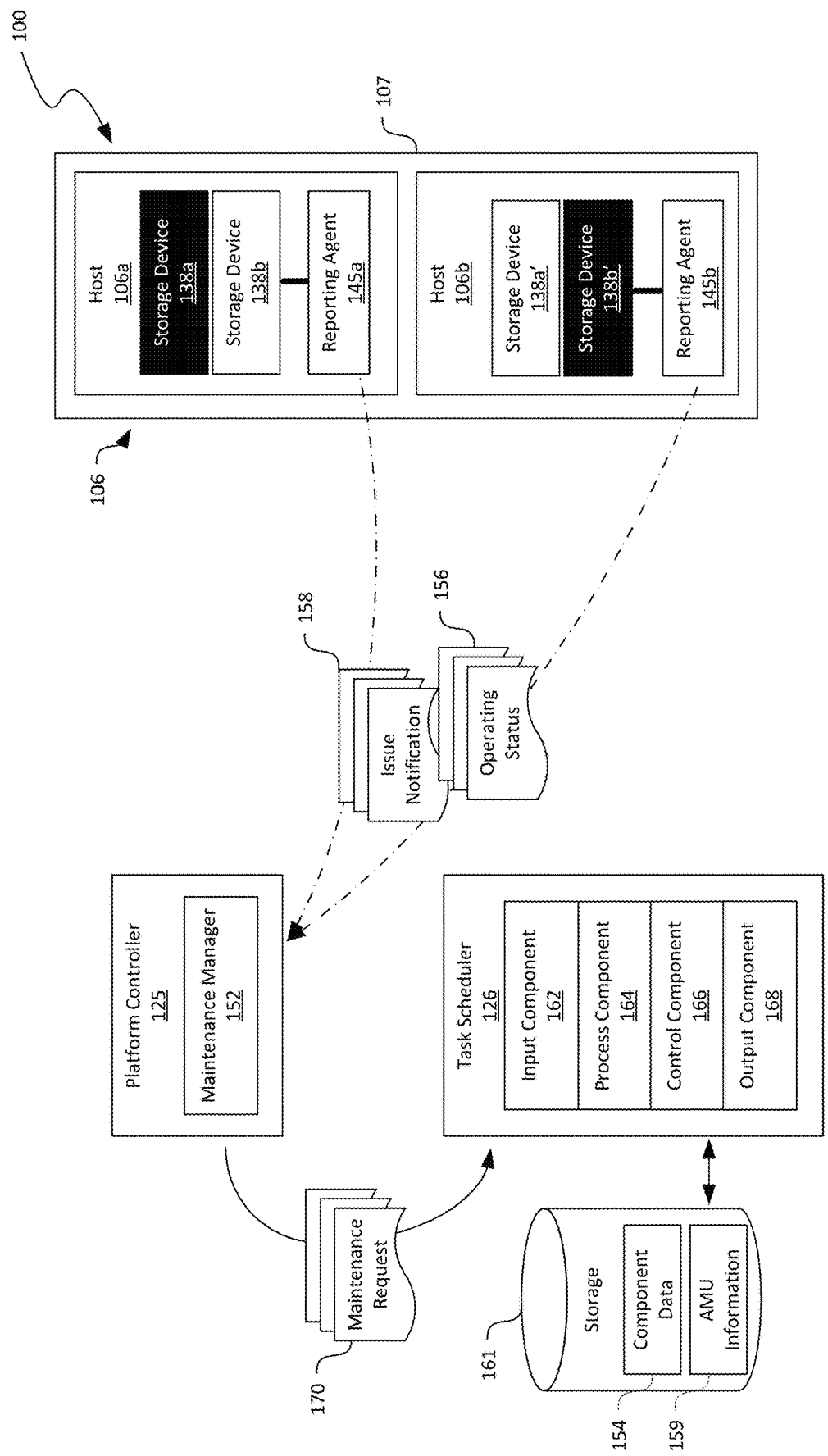
FIGS. 3A-3C are schematic diagrams illustrating the distributed computing system of FIG. 1 during certain stages of performing automated secure disposal of hardware components in accordance with embodiments of the disclosed technology.
Figure 3B:
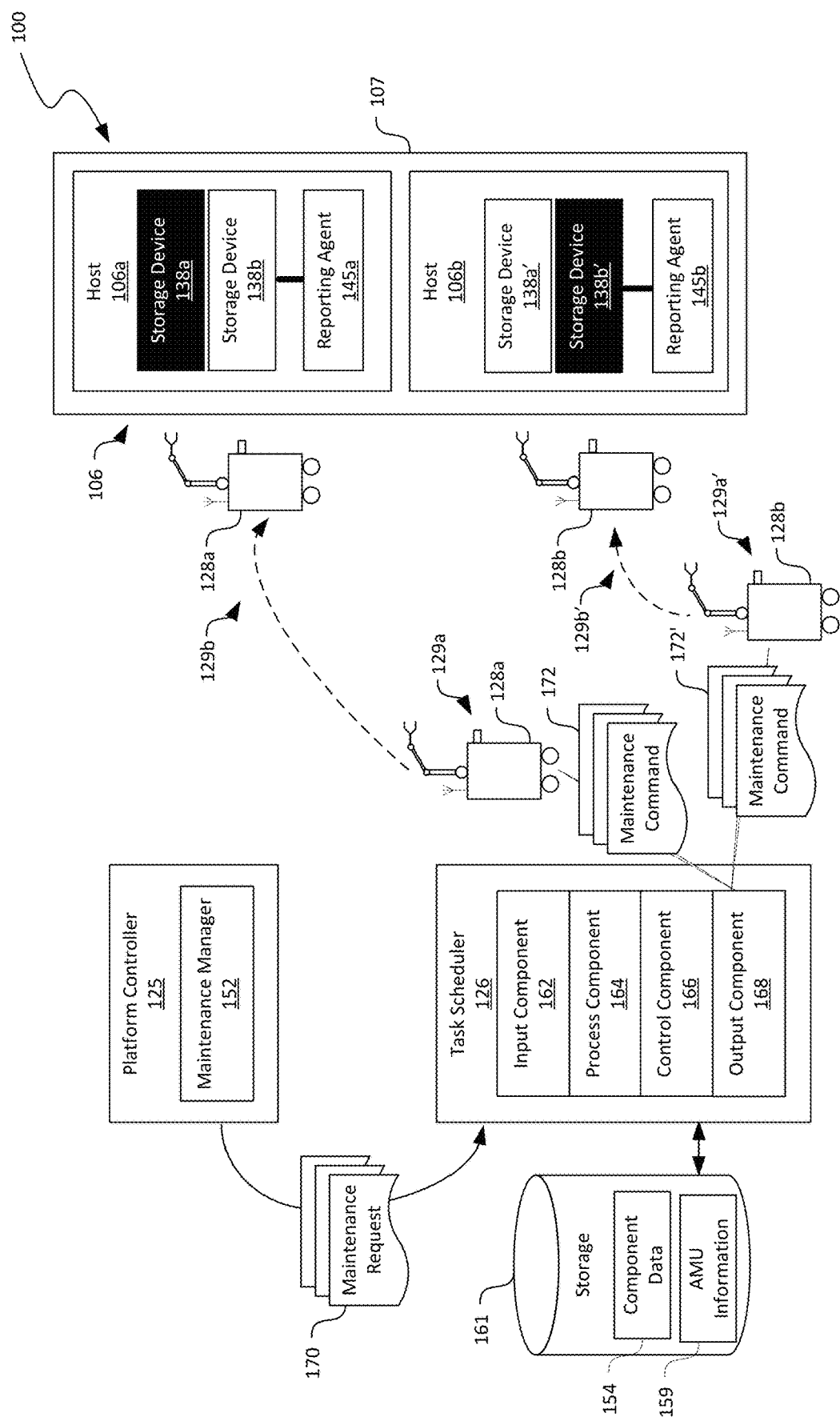
Figure 3C:
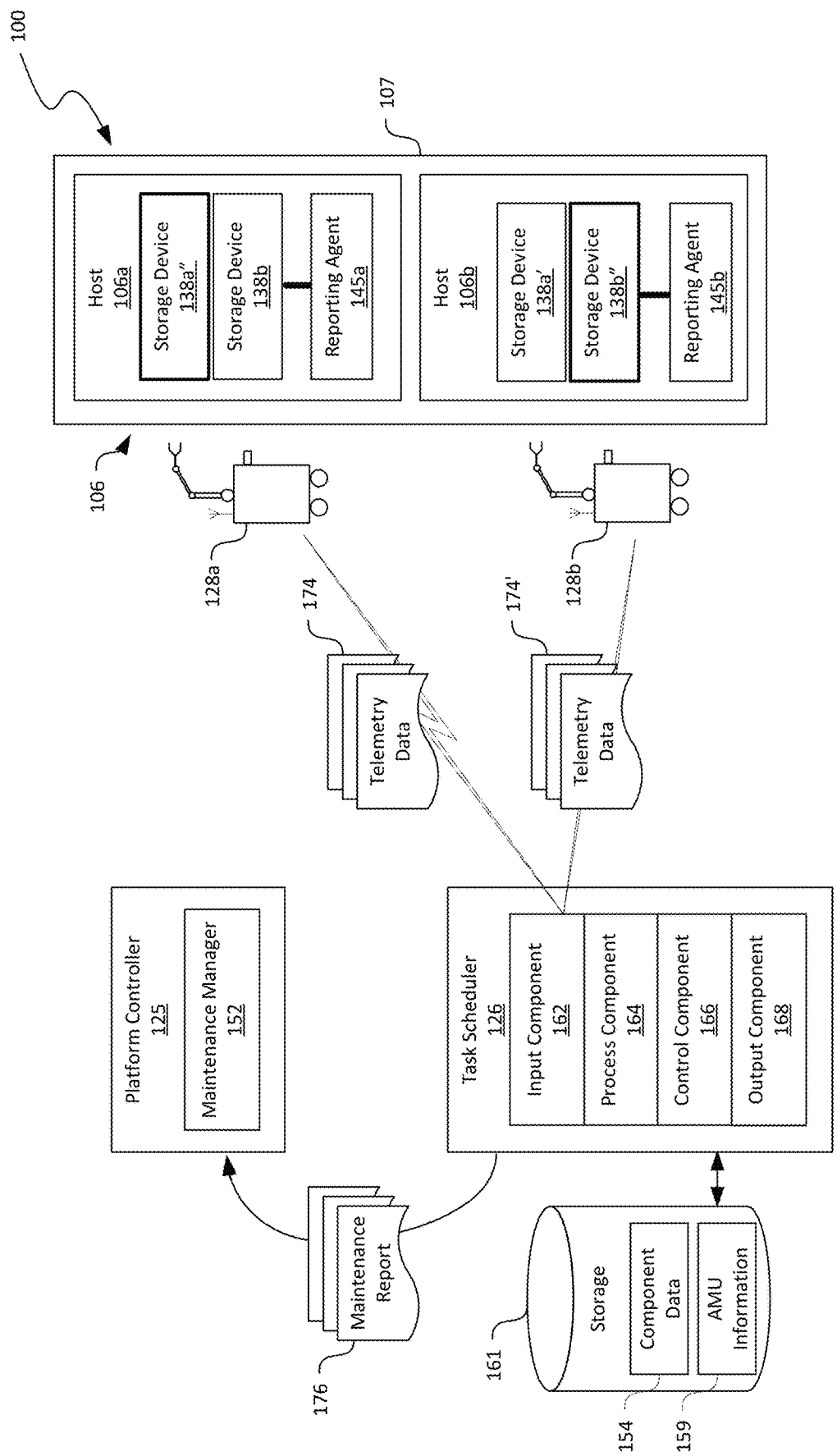

FIGS. 3A-3C are schematic diagrams illustrating the distributed computing system 100 of FIG. 1 during certain stages of performing automated secure disposal of hardware components in accordance with embodiments of the disclosed technology. In FIGS. 3A-3C, certain components of the distributed computing system 100 may be omitted for clarity. In FIGS. 3A-3C and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3A, the platform controller 125 can include a maintenance manager 152 configured to facilitate maintenance of hardware components in the distributed computing system 100. For example, as shown in FIG. 3A, the first and second hosts 106a and 106b can each include a reporting agent 145 (illustrated as first and second reporting agents 145a and 145b) configured to report operating status 156 and/or issue notification 158 regarding hardware components on the first and second hosts 106a and 106b to the maintenance manager 152 periodically or in other suitable manners via, for instance, the underlay network 108 in FIG. 1. The reporting agents 145 can be implemented as a part of the operating system, hypervisor 140 (FIG. 2), a standalone application, or other suitable component on the first and second hosts 106a and 106b.

Based on the received operating status 156 and/or the issue notification 158, the maintenance manager 152 can be configured to determine that maintenance may be needed to remedy certain issues. For example, the operating status 156 can include data regarding a time in service, a number of read/write operations performed, an operating temperature, or other suitable information regarding the hardware components on the first host 106a. Based on such information, the maintenance manager 152 can be configured to determine that the first storage device 138a on the first host 106a may require maintenance because the first storage device 138a has been in use for a period greater than a threshold or the first storage device 138a has a write count exceeding another threshold. In another example, the maintenance manager 152 may also determine that the second storage device 138b' on the second host 106b may require maintenance because the issue notification 158 received from the second host 106b indicates that the second storage device 138b' has failed, stopped responding, or experiencing other operating difficulties.

Upon determining that maintenance on certain hardware components may be required, the maintenance manager 152 of the platform controller 125 can be configured to issue a maintenance request 170 to the task scheduler 126 for scheduling maintenance operations on the hardware components via, for example, the underlay network 108 of FIG. 1. Upon receiving the maintenance request 170, the task scheduler 126 can be configured to schedule, initiate, monitor, and report progress/completion of the requested maintenance operations, as described in more detail below.

As shown in FIG. 3A, the task scheduler 126 can be operatively coupled to a computer readable storage 161. The task scheduler 126 can also include instructions executable by a processor to cause the processor to provide an input component 162, an process component 164, a control component 166, and an output component 168 operatively coupled to one another. In one embodiment, all of the foregoing software components can reside on a single computing device (e.g., the hosts 106). In other embodiments, the foregoing software components can also reside on a plurality of distinct computing devices. In further embodiments, the task scheduler 126 can also include time keeping, network interface, and/or other suitable types of components. Even though particular components and configurations of the task scheduler 126 are shown in FIGS. 3A-3C, in other embodiments, the task scheduler 126 can also include other suitable components or arrangements. For example, in certain embodiments, the storage 161 can be an internal non-volatile storage of the task scheduler 126. In other examples, the storage 161 can also be a network storage space in the distributed computing system 100 of FIG. 1.

The input component 162 can be configured to receive the maintenance request 170 from the platform controller 125. In certain embodiments, the maintenance request 170 can include information regarding identity of hardware components and associated hosts 106, physical destination locations of the hosts 106, and requested maintenance to be performed. For example, the first and second storage devices 138a and 138b' can be identified by a serial number, a signature, or other suitable types of identifier. The physical destination locations can be identified by room/enclosure, row, column, rack, or others suitable types of identifier. The requested maintenance can include identity verification, removal without replacement, removal with replacement, and/or other maintenance tasks. In other embodiments, the maintenance request 170 can also include information regarding a priority of the requested maintenance, a complete by date/time, reporting requirements, and/or other suitable information. The input component 162 can then forward the received maintenance request 170 to the process component for further processing.

The process component 164 can be configured to determine a set of maintenance operations based on the received maintenance request 170. In certain embodiments, the set of maintenance operations can include a sequence of operations conditioned on completion of a previous operation. For example, in response to a maintenance request to replace the first storage device 138a on the first host 106a, the process component 164 can be configured to determine a sequence as follows:

Verifying identify of the first storage device 138a at a destination location corresponding to the first host 106a;

Once verified, reporting to the task scheduler 126 that the identity of the first storage device 138a has been verified;

Transmitting an authorization request to remove the first storage device 138a from the first host 106a to the task scheduler 126;

Upon receiving the requested authorization, removing the first storage device 138a from the first host 106a;

Once the first storage device 138a is removed, installing a new storage device into the first host 106a;

Upon successful installation, transmitting telemetry data to the task scheduler 126 reporting identity of the newly installed storage device and performance status or any other suitable information related to the performed maintenance operations.

In other embodiments, the set of maintenance operations can include multiple operations without temporal or conditional requirements.

The process component 164 can also be configured to select an AMU for performing the determined maintenance operations based on, for instance, records of AMU information 159 contained in the storage 161. The AMU information 159 can include information regarding identity, capacity, capability, availability, current location, operating status, inventory of replacement parts carried, or other suitable profile information related to AMUs deployed in the distributed computing system 100. For instance, the AMU information 159 can include an identification number, serial number, or other suitable identifier of each AMU 128. The AMU information 159 can also include data indicating a weight threshold that an AMU 128 can lift or other suitable capacity specifications. The AMU information 159 can also include maneuvers (e.g., rotate, pivot, turn, etc.), repair operations (e.g., removal and replacement of storage devices 138) that the AMU 128 can perform or other suitable capability specifications. The AMU information 159 can also include an availability indicator indicating whether the AMU 128 is currently available, will be available at certain time, or other availability status. In other examples, the AMU information 159 can also include a power level, maintenance level, or other operating status of the AMU 128. An example schema suitable for the AMU information 159 is described in more detail below with reference to FIG. 6.

Based on the AMU information 159 and the maintenance request 170, the process component 164 can select an AMU 128 to perform the determined maintenance operations. For example, the process component 164 can filter the AMUs 128 based on capacity, capability, availability, inventory of replacement parts carried, and operating status of the AMUs 128 to derive a subset of the AMUs 128. The process component 164 can then select one or more AMUs 128 from the subset. In one example, the selected AMUs 128 can be closest to the destination location of the hosts 106 at which the maintenance operations to be performed. In another example, the selected AMUs 128 can also be one that can navigate to the destination location the fasted. In other examples, the process component 164 can select the AMUs 128 based on user designation or other suitable criteria.

Once selected, the process component 164 can forward the set of maintenance operations and the identity of the selected AMU 128 to the control component 166 for further processing. In response, as shown in FIG. 3B, the control component 166 can be configured to generate one or more maintenance commands 172 based on and configured to perform the determined maintenance operations and forward the maintenance commands 172 to the output component 168. The output component 168 can be configured to transmit the maintenance commands 172 to the selected AMUs 128. In certain embodiments, the output component 168 can include WIFI interface modules that facilitate transmission of the maintenance commands 172 to the AMUs 128 wirelessly. In other embodiments, the output component 168 can also include other suitable interface modules that facilitate transmission of the maintenance commands 172 to the AMUs 128 according to other suitable wireless protocols.

In the illustrated embodiment, the output component 168 transmits separate maintenance commands 172 and 172' to the first and second AMUs 128a and 128b, respectively. In response, the first and second AMUs 128a and 128b can autonomously navigate from a current location 129a and 129b to a destination location 129a' and 129b', respectively. The first and second AMUs 128a and 128b can then perform the determined maintenance operations to the first and second storage device 138a and 138b' at the first and second hosts 106a and 106b, respectively, for example to replace the foregoing storage devices with new first and second storage devices 138a" and 138b" (shown in FIG. 3C). Operations of the AMUs 128 are described in more detail below with reference to FIGS. 4A and 4B.

FIG. 3C illustrates that example maintenance operations have been performed by the first and second AMUs 128a and 128b on the first and second hosts 106a and 106b to replace the first and second storage devices 138a and 138b' (FIG. 3B) with new first and second storage devices 138a" and 138b", respectively. As shown in FIG. 3C, once maintenance operations are completed, the first and second AMUs 128a and 128b can transmit telemetry data 174 and 174' regarding all of the performed maintenance operations to the input component 162 of the task scheduler 126.

The telemetry data 174 can include any suitable information related to the maintenance operations performed by the first and second AMUs 128a and 128b. In one example, the telemetry data 174 can include data indicating verification of the first and second storage devices 138a and 138b' at respective destination locations, removal of the verified first and second storage devices 138a and 138b' from the first and second hosts 106a and 106b, and installation of the new first and second storage devices 138a" and 138b" into the first and second hosts 106a and 106b. In other examples, the telemetry data 174 can also include the identity of and a location at which the first and second storage devices 138a and 138b' are removed, a date and time at which the first and second storage devices 138a and 138b' are removed, an ambient temperature and/or humidity under which the first and second storage devices 138a and 138b' are removed, a video recording of removing the first and second storage devices 138a and 138b', or other suitable information. In further examples, the telemetry data 174 can also include the identity of and a location at which the new first and second storage devices 138a" and 138b" are installed, identity of the first and second hosts 106a and 106b in which the new first and second storage devices 138a" and 138b" are installed, a date and time at which new first and second storage devices 138a" and 138b" are installed, an ambient temperature and/or humidity under which new first and second storage devices 138a" and 138b" are installed, a video recording of installing the new first and second storage devices 138a" and 138b", or other suitable information.

Based on the received telemetry data 174, the process component 164 can be configured to generate, update, or otherwise manage records of component data 154 related to individual hardware components deployed in the distributed computing system 100 of FIG. 1. In one example, the process component 164 can be configured to generate or update a chain of custody regarding the first and second storage devices 138a and 138b' removed from or the new first and second storage devices 138a" and 138b" installed in the first and second hosts 106a and 106b. In other examples, the process component 164 can create or update an audit log regarding the verification and removal of the first and second storage devices 138a and 138b' from the first and second hosts 106a and 106b, respectively, or the installation of the new first and second storage devices 138a" and 138b". In further examples, the process component 164 can process the received telemetry data 174 into the component data 154 in other suitable manners. An example schema suitable for the component data 154 is described in more detail below with reference to FIG. 5.

In certain embodiments, the process component 164 can also be configured to generate a maintenance report 176 based on the telemetry data 174 and cause the output component 168 to transmit the maintenance report 176 to the platform controller 125. Based on the maintenance report 176, the maintenance manager 152 of the platform controller 125 can then verify that the maintenance request 170 (FIG. 3A) has been adequately addressed by, for example, receiving additional operating status 156 (FIG. 3A) from the first and second hosts 106a and 106b. In other embodiments, the telemetry data 174 can also include information related to status of the first and second AMUs 128a and 128b. The status can include, for example, a current location, a current power level, a number of removed storage devices 138 carried, or other suitable information. The process component 164 can then update the AMU information 159 based on the received status of the first and second AMUs 128a and 128b.

Several embodiments of the disclosed technology can be efficient in tracking hardware components in the distributed computing system 100. For example, utilizing AMUs 128 instead of technicians can reduce if not eliminate manual operations involved in verifying, removing, and destroying failed hardware components. The AMUs 128 can also prevent removal of hardware components from the distributed computing system 100 unless such removal is authorized. Also, by using AMUs 128, human access to the facility housing the distributed computing system 100 can be reduced to improve security. In addition, by allowing direct communications between the task scheduler 126 and the AMUs 128, record keeping regarding any performed maintenance operations and status of installed or removed hardware components is straightforward and inexpensive.

In FIGS. 3A-3C, each maintenance command 172 is illustrated as being directed to one AMU 128. In other embodiments, multiple AMUs 128 can be tasked by one maintenance command 172. For instance, in the example shown in FIG. 3B, both the first and second AMUs 128a and 128b can be tasked to perform maintenance operations on the first storage device 138a in the first host 106a. In example implementations, the first AMU 128a can be tasked to verify the first storage device 138a. Upon verification, the first AMU 128a can indicate to the second AMU 128b that the first storage device 138a has been verified and is ready for subsequent maintenance operations. In response, the second AMU 128b can remove, replace, and/or perform additional maintenance operations on the first storage device 138a. In other example implementations, the second AMU 128b can only remove the first storage device 138a. Upon removal, the second AMU 128b can indicate to a third AMU (not shown) configured to install a new storage device and/or perform other suitable maintenance operations on the first host 106a.

Figure 4A:
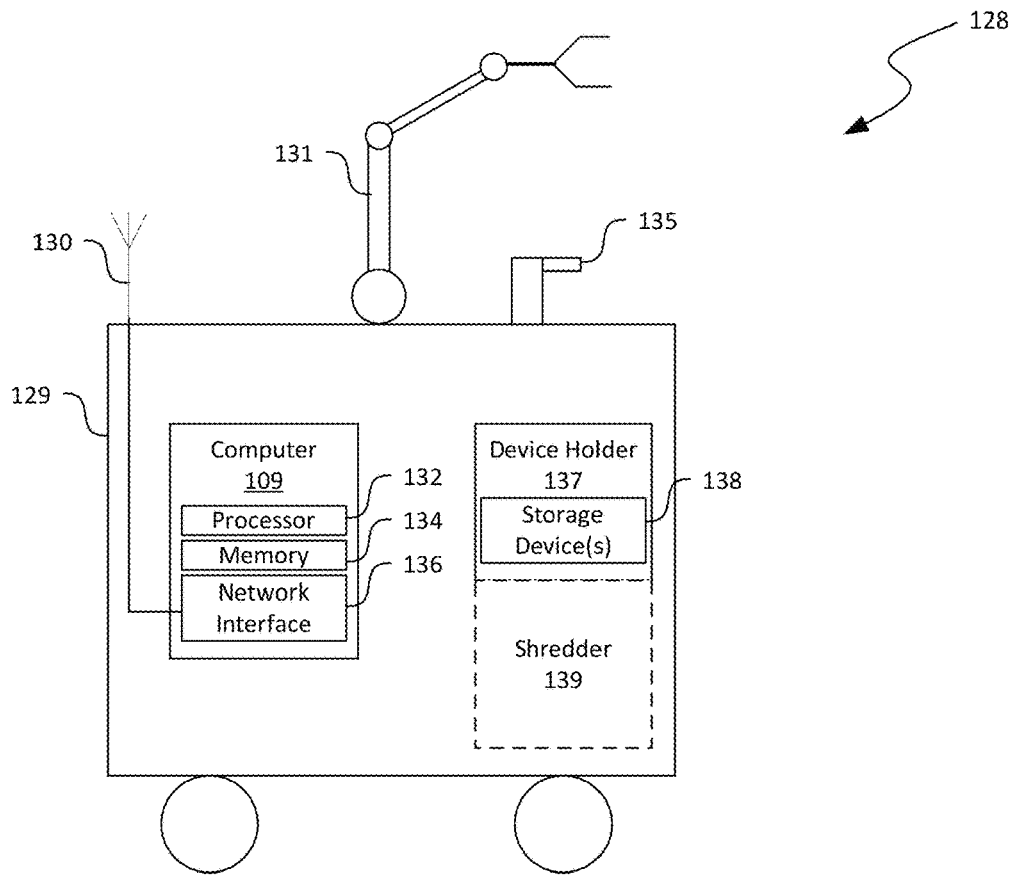
FIG. 4A is a schematic block diagram illustrating an example autonomous mobile unit suitable for the distributed computing system in FIG. 1 in accordance with embodiments of the disclosed technology.

FIG. 4A is a schematic block diagram illustrating an example AMU 128 suitable for the distributed computing system in FIG. 1 in accordance with embodiments of the disclosed technology. As shown in FIG. 4A, the AMU 128 can include a computer 109 installed on a self-driving robot 129. The computer 109 can include a processor 132, a memory 134, and a network interface 136 operatively coupled to an antenna 130. The computer 109 can be configured to communicate wirelessly with the task scheduler 126 (FIGS. 3A-3C) via the network interface 136 and the antenna 130. The memory 134 can contain instructions executable by the processor 132 to cause the processor to provide certain software components, as described in more detail below with reference to FIG. 4B.

As shown in FIG. 4A, the AMU 128 can also include a secure device holder 137 carried on the self-driving robot 129. The secure device holder 137 can include a box with a slot to receive removed hardware components (e.g., storage devices 138. The box can be accessed with a key, code, or other security measures. Optionally, the AMU 128 can also include a shredder 139 (or other suitable destruction device) carried by the self-driving robot 129 and configured to shred the storage devices 138. In other embodiments, the shredder 139 may be omitted. Also shown in FIG. 4A, the AMU 128 can include one or more robotic arms 131 (only one is shown for illustration purposes), scanners 135 (e.g., barcode or RF scanners) carried on the self-driving robot. In further embodiments, the AMU 128 can also include stereo video camera, LIDAR, GPS, or other suitable sensors.

Figure 4B:
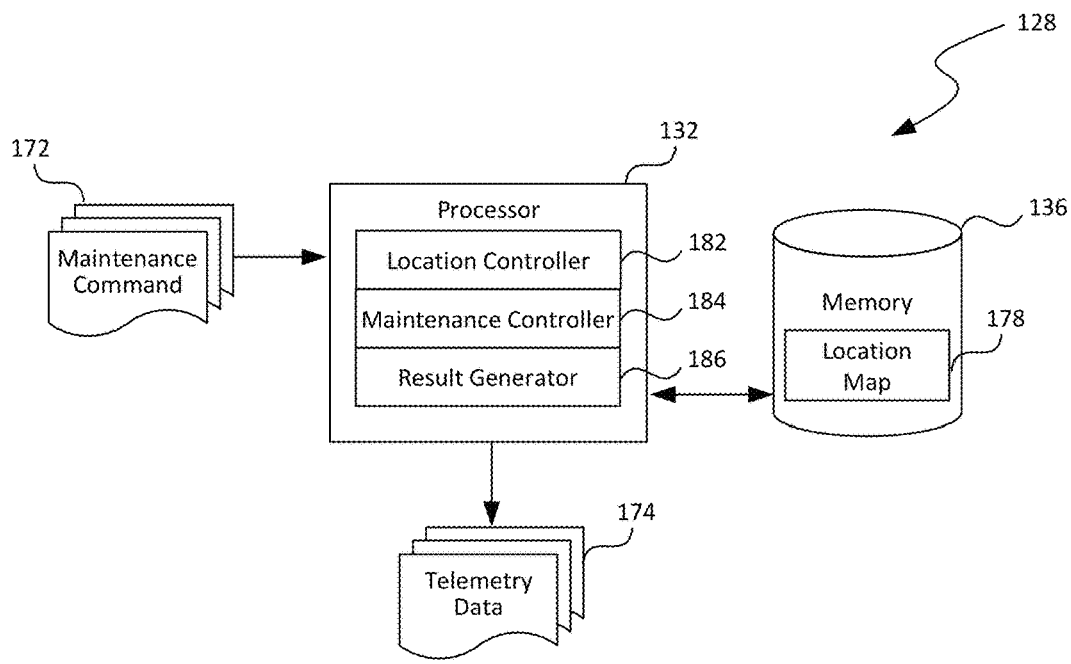
FIG. 4B is a schematic block diagram illustrating software components suitable for the computer in FIG. 4A in accordance with embodiments of the disclosed technology.

FIG. 4B is a schematic block diagram illustrating software components suitable for the computer 109 in FIG. 4A in accordance with embodiments of the disclosed technology. As shown in FIG. 4B, the processor 132 of the computer 109 can execute suitable instructions to provide a location controller 182, a maintenance controller 184, and a result generator 186 operatively coupled to one another. The location controller 182 can be configured to determine a destination location based on, for example, information contained in the received maintenance command 172. In one example, the computer 109 can contain a location map 178 of hosts 106 (FIG. 1) or other hardware components in the distributed computing system 100 of FIG. 1. The location controller 182 can thus determine a destination location by comparing an identity of a host 106 included in the maintenance command 172 with the location map 178. In other examples, the maintenance command 172 can contain the destination location. Once determined, the location controller 182 can instruct the self-driving robot 129 (FIG. 4A) to navigate from a current location to the destination location.

The maintenance controller 184 can be configured to determine sequences of performing the maintenance operations included in the maintenance command 172. For example, the maintenance controller 184 can instruct the robotic arm 131 to pivot, extend, retract, grab, or perform other actions. The maintenance controller 184 can also instruct the scanner 135 to scan a barcode, an RF tag, or other identification of the first and second storage devices 138a and 138b' (FIG. 3A). The maintenance controller 184 can also be configured to inform the result generator 186 once certain or all maintenance operations are completed. In response, the result generator 186 can generate and transmit to the task scheduler 126 (FIG. 3A) telemetry data 174 regarding the maintenance operations performed.

Figure 5:
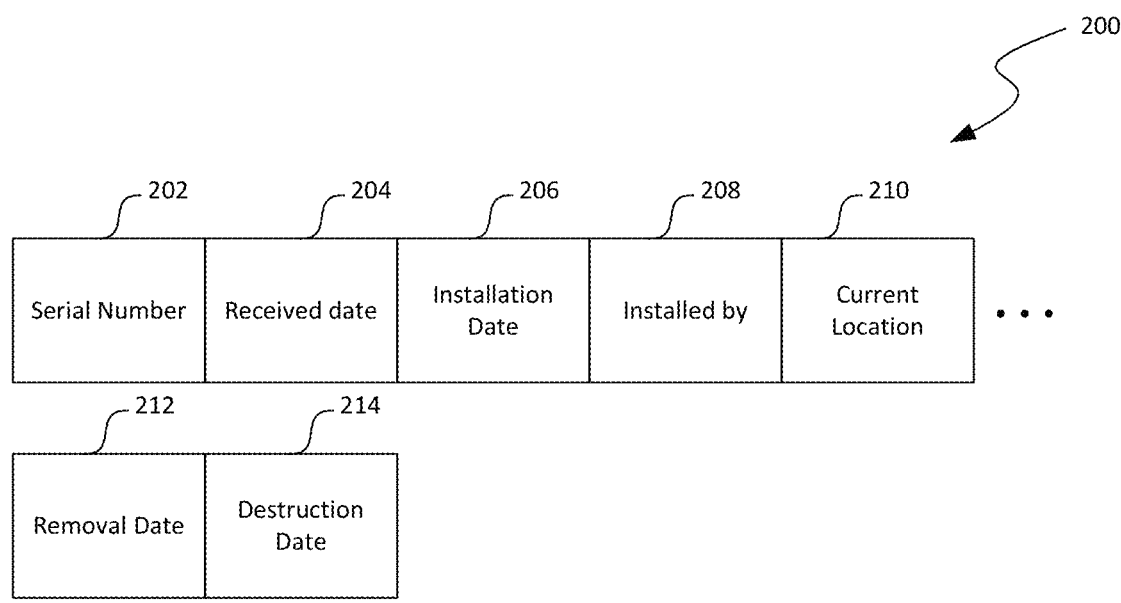
FIG. 5 is a block diagram illustrating an example data schema suitable for a component data in accordance with embodiments of the disclosed technology.

FIG. 5 is a block diagram illustrating an example data schema 200 suitable for a component data in accordance with embodiments of the disclosed technology. As shown in FIG. 5, the data schema 200 can include a serial number field 202, a received date 204, an installation date 206, an installed by field 208, a current location field 210, a removal date 212, and a destruction date 214. The serial number field 202 can contain a serial number or other suitable identification of a hardware component. The received date field 204 can contain a date/time at which the hardware component is received from, for example, a manufacture. The installation date field 206 can contain a date/time at which the hardware component is installed. The installed by field 208 can contain an identification of a technician, an AMU 128 (FIG. 2), or an entity who installed the hardware component. The current location field 210 can contain a current physical location of the hardware component (e.g., in stock room, installed on a server, etc.). The removal date 212 can contain a date/time at which the hardware component is removed or uninstalled from a server. The destruction date field 214 can contain a date/field at which the hardware component is destructed, for example, by shredding, hold punching, or other suitable means.

Figure 6:
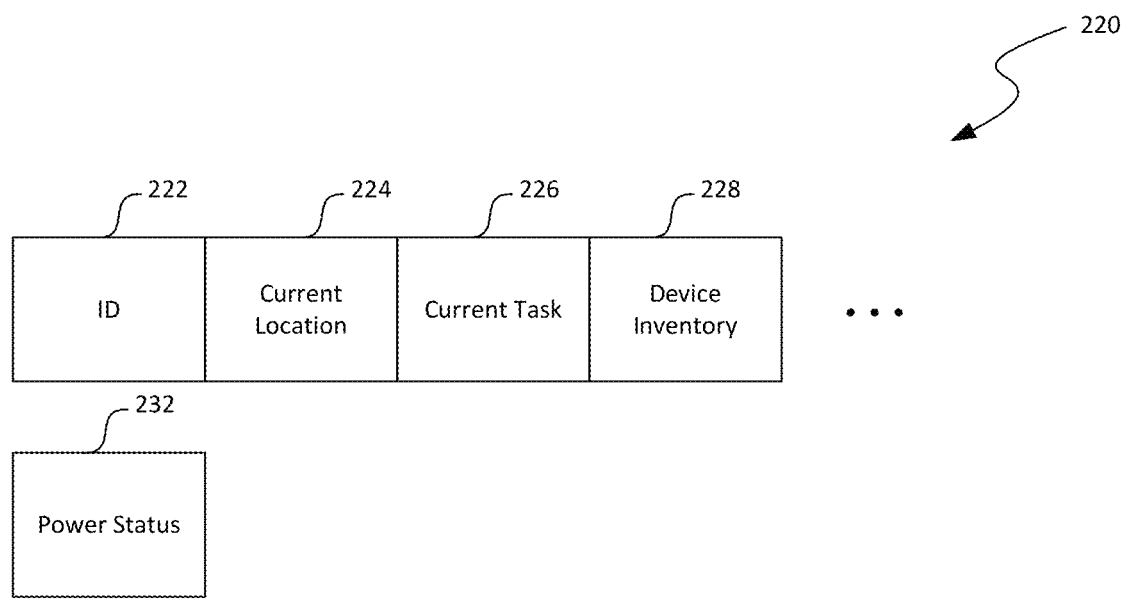
FIG. 6 is a block diagram illustrating an example data schema suitable for a status record of an autonomous mobile unit in accordance with embodiments of the disclosed technology.

FIG. 6 is a block diagram illustrating an example data schema 220 suitable for a record of AMU information of an autonomous mobile unit in accordance with embodiments of the disclosed technology. As shown in FIG. 6, the data schema 220 can include an ID field 222, a current location field 224, a current task field 226, a device inventory field 228, and a power status field 232. The ID field 222 can contain a serial number or other suitable identification of an AMU 128 (FIG. 2). The current location field 224 can contain data (e.g., a GPS grid) representing a current location of the AMU 128. The current task field 226 can contain data indicating a current task that the AMU 128 is performing or the AMU 128 is currently idle. The device inventory field 228 can contain data indicating a number/type replacement hardware components that the AMU 128 currently carries. The power status field 232 can contain a current power level (e.g., voltage, charging status, etc.) of the AMU 128.

Figure 7:
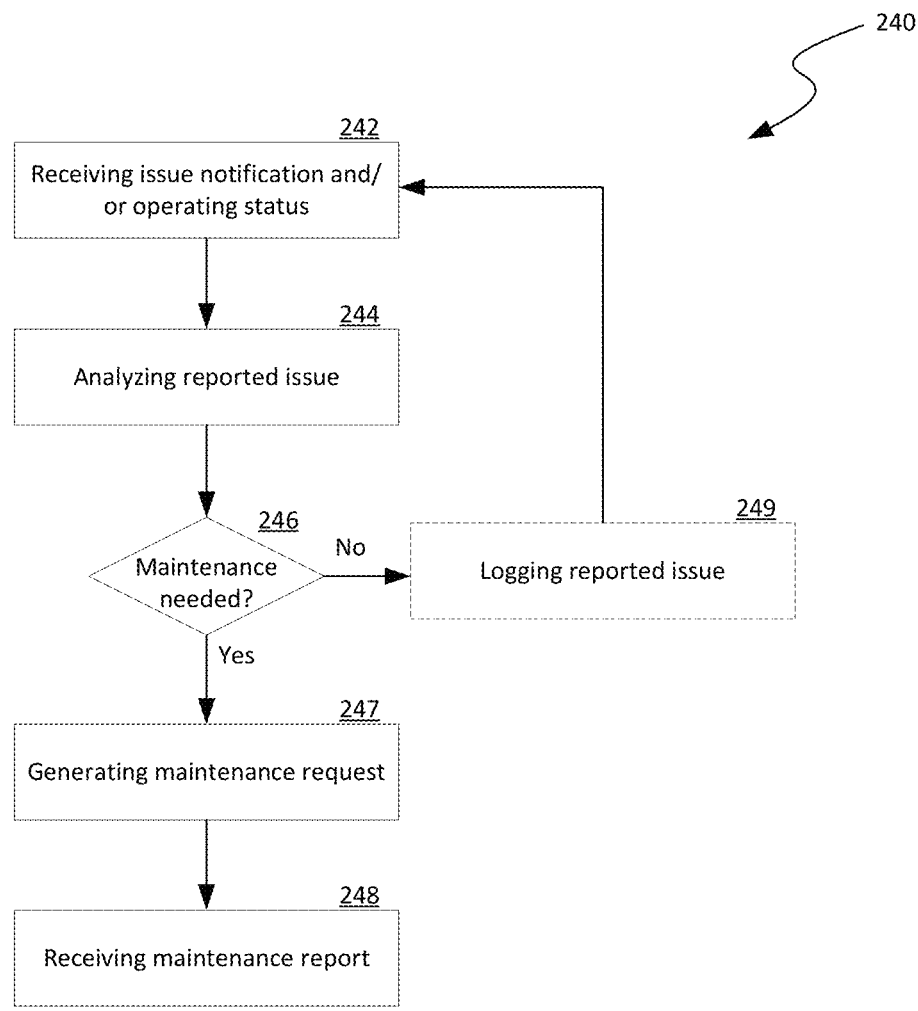
FIGS. 7-9 are flowcharts illustrating aspects of performing automated secure disposal of hardware components in a distributed computing system in accordance with embodiments of the disclosed technology.

FIG. 7 is a flowchart illustrating aspects of a process 240 of performing automated secure disposal of hardware components in a distributed computing system in accordance with embodiments of the disclosed technology. Even though the process 240 and other processes described below are discussed in light of the distributed computing system 100 of FIG. 1, in other embodiments, the various processes can also be implemented in computing systems with different and/or additional components.

As shown in FIG. 7, the process 240 can include receiving an issue notification and/or operating status of a hardware component currently installed at stage 242. The process 240 can also include analyzing the received issue and/or operating status to determine whether maintenance on the hardware component is needed, as described above with reference to FIG. 3A. At stage 246, in response to determining that maintenance is needed, the process 240 can include generating a maintenance request at stage 247. Subsequently, the process 240 can include receiving a maintenance report in response to the maintenance request at stage 248 and optionally verifying whether the reported issue has been resolved. In response to determining that maintenance is not needed, the process 240 can include optionally logging the reported issue at stage 249 before reverting to receiving additional issue notifications and/or operating status at stage 242.

Figure 8A:
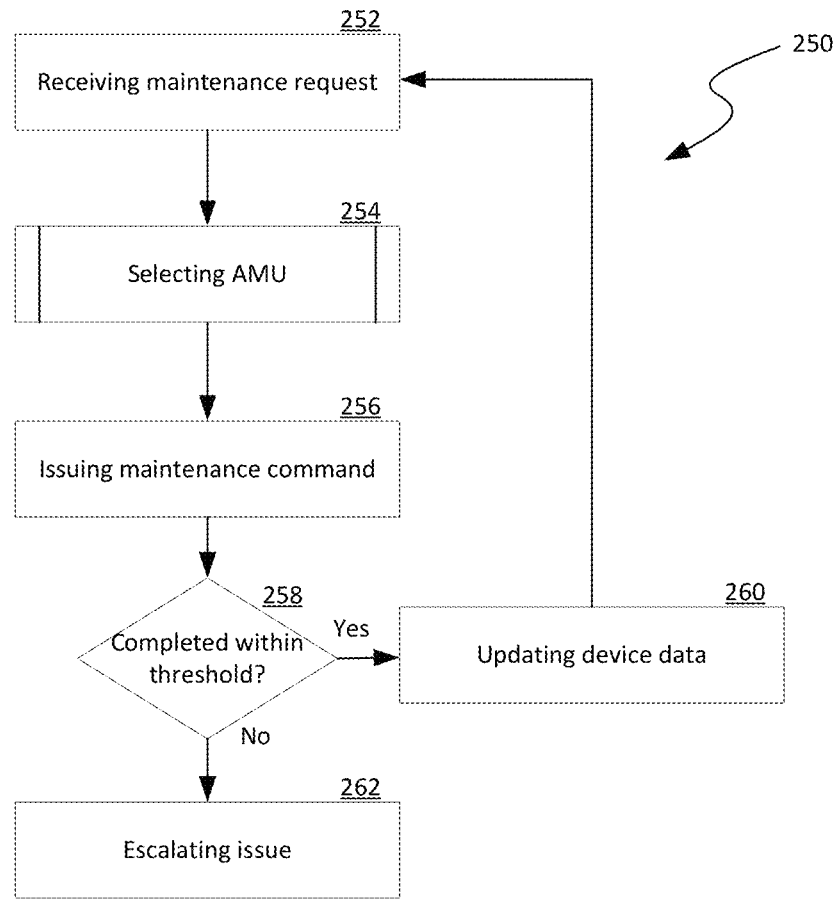
Figure 8B:
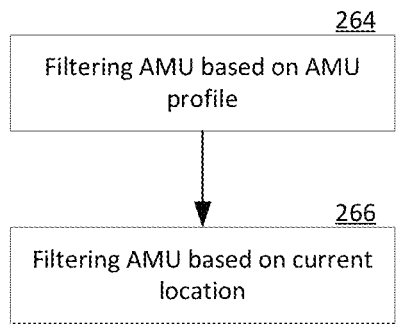

FIGS. 8A and 8B are flowcharts illustrating aspects of a process 250 of performing automated secure disposal of hardware components in a distributed computing system in accordance with embodiments of the disclosed technology. As shown in FIG. 8A, the process 250 can include receiving a maintenance request at stage 252 and selecting an AMU for addressing the maintenance request at stage 254. Example operations suitable for selecting the AMU based on the maintenance request and AMU information are described in more detail below with reference to FIG. 8B. Other examples of selecting the AMU are described above with reference to FIGS. 3A-3C.

The process 250 can then include issuing maintenance commands to the selected AMU at stage 256, as described above with reference to FIGS. 3A-3C. the process 250 can then include a decision stage 258 to determine whether the requested maintenance operations are completed within a time threshold (e.g., 2 hours). In response to determining that the requested maintenance operations are completed, the process 250 can include updating records of device data related to hardware components in the distributed computing system 100 at stage 260, as described above with reference to FIGS. 3A-3C, before reverting to receiving additional maintenance requests at stage 252. In response to determining that the requested maintenance operations are not completed within the time threshold, the process 250 can include escalating the issue to an administrator or other suitable entities at stage 262.

FIG. 8B is a flowchart illustrating example operations for selecting an AMU. As shown in FIG. 8B, the operations can include filter a list of AMUs based on AMU profile at stage 264. The AMU profile can include information related to capacity, capability, availability, inventory of replacement parts carried, operating status of the AMUs, or other characteristics of the AMUs, as described above with reference to FIGS. 3A-3C.

Figure 9:
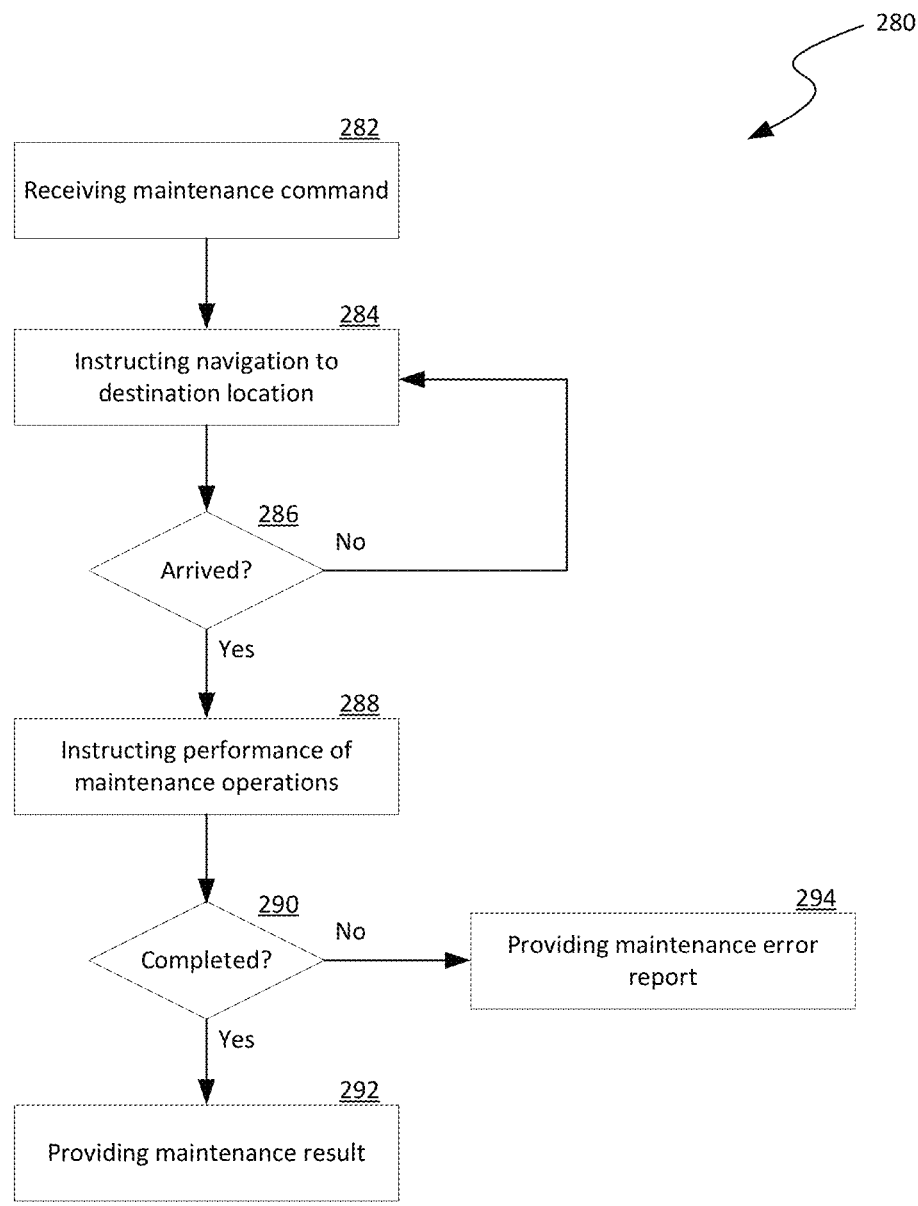

FIG. 9 is a flowchart illustrating aspects of a process 280 of performing automated secure disposal of hardware components in a distributed computing system in accordance with embodiments of the disclosed technology. As shown in FIG. 9, the process 280 can include receiving a maintenance command for performing one or more maintenance operations on a hardware component at stage 282. The process 280 can then include instructing, for example, the self-driving robot 129 of FIG. 4A, to navigate to a destination location in the distributed computing system 100 of FIG. 1 at stage 284.

The process 280 can then include a decision stage 286 to determine whether a current location matches the destination location. In response to determining that the destination location has arrived, the process 280 can include instructing, for example, the robotic arm 131 and the scanner 135 to perform the one or more maintenance operations at stage 288. The process 280 can then include another decision stage 290 to determine whether the maintenance operations have completed within a time threshold. In response to determining that the maintenance operations have completed within the time threshold, the process 280 can proceed to generating and providing maintenance results of the performed maintenance operations as telemetry data at stage 292, as described in more detail above with reference to FIG. 3C. In response to determining that the maintenance operations have not completed within the time threshold, the process 280 can include generating and providing a maintenance error report 294 to an administrator, maintenance supervisor, or other suitable entities at stage 294.

Figure 10:
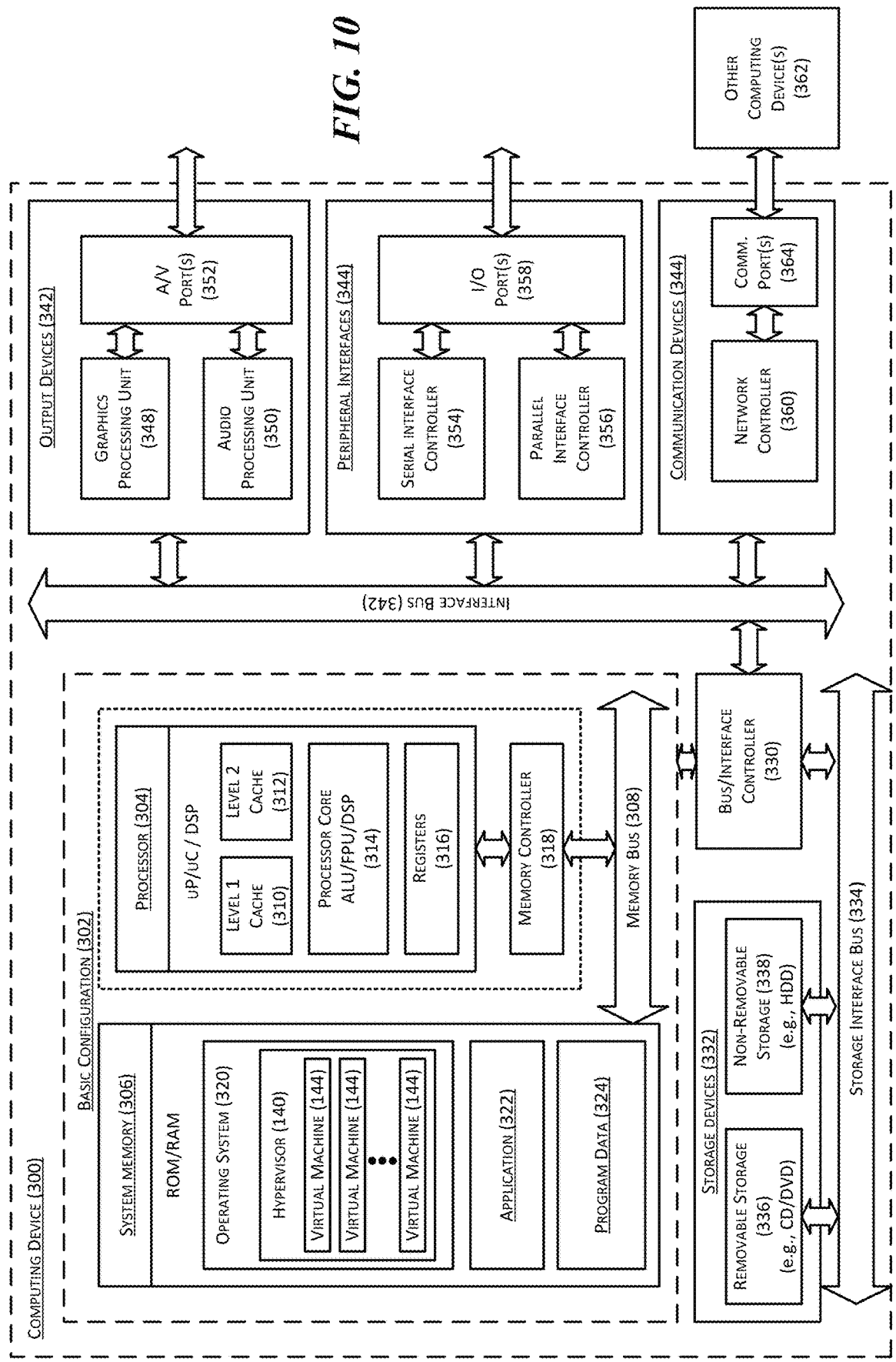
FIG. 10 is a computing device suitable for certain components of the distributed computing system in FIG. 1.

FIG. 10 is a computing device 300 suitable for certain components of the computing system 100 in FIG. 1. For example, the computing device 300 can be suitable for the client devices 102, the hosts 106, the platform controller 125, or the task scheduler 126 of FIG. 1 or the computer 109 in FIG. 4A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 9, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed by a computing device in a computing system having a plurality of servers interconnected by a computer network, the method comprising:
   receiving, via the computer network, data representing a maintenance request to replace a hardware component installed in one of the plurality of servers; and
   in response to receiving the maintenance request,
      selecting an autonomous mobile unit ("AMU") to replace the hardware component installed in the one of the plurality of servers;
      transmitting a maintenance command to the selected autonomous mobile unit ("AMU"), the maintenance command instructing the selected AMU to autonomously navigate from a current location to a destination location corresponding to the one of the plurality of servers in which the hardware component is installed and to replace the hardware component;
      receiving, from the selected AMU, a verification indication indicating that an identity of the hardware component is verified by the selected AMU;
      upon receiving the verification indication, transmitting, to the selected AMU, an authorization to remove the hardware component from the one of the plurality of servers;
      subsequently, receiving, from the selected AMU, telemetry data indicating removal of the hardware component from the one of the plurality of servers and secure destruction of the removed hardware component; and
      creating an entry in an audit log regarding the removal and secure destruction of the hardware component from the one of the plurality of servers.

2. The method of claim 1 wherein:
   receiving the data representing the maintenance request includes receiving the data representing the maintenance request from a platform controller of the computing system, the maintenance request being issued by the platform controller based on a notification of an issue from the one of the plurality of servers in which the hardware component is installed; and
   the method further includes transmitting a maintenance report to the platform controller based on the created entry in the audit log, the maintenance report allowing the platform controller to verify that the issue contained in the notification has been addressed.

3. The method of claim 1 wherein the maintenance command instructs the selected AMU to perform a sequence of:
   verifying identity of the hardware component at the destination location;

upon verification, removing the hardware component from the one of the plurality of servers;

subsequent to removing the hardware component, installing a new hardware component into the one of the plurality of servers; and transmitting telemetry data representing an identity of the new hardware component and an indication that the new hardware component is installed in the one of the plurality of servers.

4. The method of claim 1 wherein selecting the AMU includes:

identifying a set of AMUs suitably configured to replace the hardware component installed in the one of the plurality of servers; and selecting, from the identified set of AMUs, one AMU that is closest to the destination location corresponding to the one of the plurality of servers.

5. The method of claim 1 wherein:

receiving the telemetry data includes receiving the telemetry data indicating the current location of the selected AMU; and in response to receiving the telemetry data, updating a status record corresponding to the selected AMU with the current location of the selected AMU.

6. The method of claim 1 wherein:

the destruction device includes one of a shredder or a hole puncher on board the selected AMU.

7. The method of claim 1, further comprising:

receiving additional telemetry data indicating that the hardware component is verified and is about to be removed from the one of the plurality of servers; and transmitting, to the selected AMU, an authorization message authorizing removal of the hardware component.

8. The method of claim 1, further comprising identifying a chain of custody of the hardware component removed from the one of the plurality of servers based on the created entry in the audit log.

9. The method of claim 1, further comprising:

receiving, from the selected AMU, a request for credential to enter a secure area in which the one of the plurality of servers is located; and in response to receiving the request, generating and transmitting credential to the selected AMU, thereby allowing the selected AMU to enter into the secure area.

10. A method performed by a computer on an autonomous mobile unit ("AMU") in a computing system having a plurality of servers interconnected by a computer network, wherein the method comprises:

receiving, from a task scheduler of the computing system, data representing a maintenance command instructing removal of a hardware component from one of the plurality of servers located at a destination location in a datacenter; and in response to receiving the maintenance command, instructing the AMU to autonomously navigate from a current location to the destination location corresponding to the one of the plurality of servers;

upon arrival at the destination location, verifying an identity of the hardware component; and upon verification of the identity of the hardware component, transmitting, to the task scheduler, an indication that the hardware component is verified;

receiving, from the task scheduler, an authorization to remove the hardware component from the one of the plurality of servers;

based on the received authorization, instructing a robotic arm on the AMU to remove the hardware component from the one of the plurality of servers and facilitate secure destruction of the removed hardware component; and upon successful removal and secure destruction of the hardware component by the robotic arm, generating and transmitting, to the task scheduler of the computing system, telemetry data indicating successful removal and secure destruction of the hardware component from the one of the plurality of servers.

11. The method of claim 10, further comprising:

upon successful removal of the hardware component from the one of the plurality of servers, installing a new hardware component in the one of the plurality of servers as a replacement of the removed hardware component; and upon successful installation of the new hardware component, generating and transmitting, to the task scheduler, telemetry data indicating the successful installation and an identity of the new hardware component.

12. The method of claim 10 wherein verifying the identity of the hardware component includes:

scanning a barcode or an RF tag on the hardware component using the barcode scanner or the RF tag scanner, respectively;

determining whether the scanned barcode or the RF tag matches one included in the maintenance command;

in response to determining that the scanned barcode or the RF tag matches one included in the maintenance command, indicating that the identity of the hardware component is verified.

13. The method of claim 10 wherein verifying the identity of the hardware component includes:

scanning a barcode or an RF tag on the hardware component using the barcode scanner or the RF tag scanner, respectively;

determining whether the scanned barcode or the RF tag matches one included in the maintenance command; and in response to determining that the scanned barcode or the RF tag matches one included in the maintenance command, indicating that the identity of the hardware component is verified; and allowing the robotic arm to remove the hardware component from the one of the plurality of servers.

14. The method of claim 10 wherein verifying the identity of the hardware component includes:

scanning a barcode or an RF tag on the hardware component using the barcode scanner or the RF tag scanner, respectively;

determining whether the scanned barcode or the RF tag matches one included in the maintenance command;

in response to determining that the scanned barcode or the RF tag does not match one included in the maintenance command, indicating that the identity of the hardware component is not verified; and preventing the robotic arm from removing the hardware component from the one of the plurality of servers.

15. The method of claim 10, further comprising:

upon successful removal of the hardware component by the robotic arm, generating and transmitting, to the task scheduler, telemetry data indicating at least one of:

a location in the datacenter at which the hardware component is removed;
a date and time at which the hardware component is removed;
an ambient temperature and/or humidity under which the hardware component is removed; or
a video recording of removing the hardware component.

16. The method of claim 10 wherein the hardware component includes a persistent storage device, a network interface card, or a backup power unit.

17. A computing device in a computing system having a plurality of servers interconnected by a computer network, the computing device comprising:
a processor; and
a memory operatively coupled to the processor, the memory containing instructions executable by the processor to cause the processor to:
select an autonomous mobile unit ("AMU") to remove a hardware component from one of the plurality of servers in the computing system;
transmit a maintenance command to the selected AMU, the maintenance command instructing the selected AMU to autonomously navigate to a destination location corresponding to the one of the plurality of servers in which the hardware component is installed and to remove the hardware component from the one of the plurality of servers;
receive, from the selected AMU, a verification indication indicating that an identity of the hardware component is verified by the selected AMU;
upon receiving the verification indication, transmit, to the selected AMU, an authorization to remove the hardware component from the one of the plurality of servers;
subsequently, receive, from the selected AMU, telemetry data indicating successful removal of the hardware component from the one of the plurality of servers and secure destruction of the removed hardware component; and
based on the received telemetry data, update an entry in an audit log regarding the successful removal and secure destruction of the hardware component from the one of the plurality of servers.

18. The computing device of claim 17 wherein to select the AMU includes:
to identify a set of AMUs suitably configured to remove the hardware component from one of the plurality of servers in the computing system; and
to select, from the identified set of AMUs, one AMU that is closest to the destination location corresponding to the one of the plurality of servers.

19. The computing device of claim 17 wherein:
the maintenance command also instructs the selected AMU to install a new hardware component in the one of the plurality of servers as a replacement of the removed hardware component; and
the instructions are executable by the processor to cause the processor to:
receive, from the selected AMU, additional telemetry data indicating successful installation of the new hardware component in the one of the plurality of servers; and
an identity of the new hardware component that is installed in the one of the plurality of servers.

\* \* \* \* \*